(12) United States Patent
Hofmann et al.

(10) Patent No.: US 12,090,784 B2
(45) Date of Patent: Sep. 17, 2024

(54) WHEEL HOLDER

(71) Applicant: Beissbarth GmbH, Munich (DE)

(72) Inventors: Claudia Hofmann, Munich (DE); Stefanie Peters, Munich (DE); Trendafil Ilchev, Munich (DE); Christian Wagmann, Munich (DE); Nicolai Ganser, Munich (DE)

(73) Assignee: BEISSBARTH AUTOMOTIVE TESTING SOLUTIONS GMBH, Munich (DE)

( * ) Notice: Subject to any disclaimer, the term of this patent is extended or adjusted under 35 U.S.C. 154(b) by 422 days.

(21) Appl. No.: 17/612,003

(22) PCT Filed: May 14, 2020

(86) PCT No.: PCT/EP2020/063493
§ 371 (c)(1),
(2) Date: Nov. 17, 2021

(87) PCT Pub. No.: WO2020/234116
PCT Pub. Date: Nov. 26, 2020

(65) Prior Publication Data
US 2022/0242168 A1     Aug. 4, 2022

(30) Foreign Application Priority Data
May 17, 2019 (DE) .................. 10 2019 113 122.7

(51) Int. Cl.
    *B60B 30/02*      (2006.01)
    *B60B 30/04*      (2006.01)
(52) U.S. Cl.
    CPC .................. *B60B 30/04* (2013.01)
(58) Field of Classification Search
    CPC ........... B60B 30/04; B60B 30/02; G01B 5/25; G01B 5/0004; G01B 5/255; G01B 21/26;
(Continued)

(56) References Cited

U.S. PATENT DOCUMENTS 5,446,967 A * 9/1995 Gender .................. G01B 5/255
                                                      33/336
8,376,018 B2 * 2/2013 Corghi ................ B60C 25/0545
                                                      157/16
(Continued)

FOREIGN PATENT DOCUMENTS

DE          102 42 536 B3     4/2004
DE    10 2016 217290 A1     3/2018
(Continued)

OTHER PUBLICATIONS

U.S. Pat. No. 11,009,335 submitted as English language translation of DE102016217290A1, Mar. 18, 2018.
(Continued)

*Primary Examiner* — Hadi Shakeri
(74) *Attorney, Agent, or Firm* — Ware, Fressola, Maguire & Barber LLP

(57) ABSTRACT

A wheel holder (2) for fastening to a wheel (1), in particular to a wheel (1) of a motor vehicle, comprises at least two arms (22, 23, 24) extending outward from a center (28) of the wheel holder (2) in a radial direction; each of the arms (22, 23, 24) having at least one movable element (32, 33, 34) that is movable in the radial direction; a rotation element (40) that is arranged in the center (28) of the wheel holder (2) such that it can rotate; at least two coupling elements (52, 53, 54) each extending between one of the movable elements (32, 33, 34) and the central rotation element (40) such that the movable elements (32, 33, 34) are movable in the radial direction by rotation of the rotation element (40); and at least one drive device (63, 64) which is connected to one of the movable elements (32, 33, 34) via a force transmitting element (73, 74) and which is designed to apply, via the force transmitting element (73,74), a force to the movable (Continued)

element (32, 33, 34) that is directed towards the center (28) of the wheel holder (2).

19 Claims, 5 Drawing Sheets

(58) Field of Classification Search
CPC ...... G01B 11/275; B01G 5/25; B01G 5/0004; B01M 17/04; B60C 25/02; B60C 25/04
USPC .......................................................... 157/14
See application file for complete search history.

(56) References Cited

U.S. PATENT DOCUMENTS

| | | |
|---|---|---|
| 11,009,335 B2 | 5/2021 | Kambhaluru et al. |
| 2014/0115906 A1 | 5/2014 | Pruitt et al. |
| 2018/0347974 A1 | 12/2018 | Ferrari et al. |

FOREIGN PATENT DOCUMENTS

| | | |
|---|---|---|
| DE | 102019113122 A1 | 11/2020 |
| DE | 102019113128 A1 | 11/2020 |
| WO | 2017/093922 A1 | 6/2017 |
| WO | 2018/046222 A1 | 3/2018 |

OTHER PUBLICATIONS

English language Abstract of DE10242536B3, Apr. 15, 2014.
English language Abstract of DE102019113122A1, Nov. 19, 2020.
English language Abstract of DE102019113128A1, Nov. 19, 2020.

\* cited by examiner

WHEEL HOLDER

The invention relates to a wheel holder or wheel clamp, in particular a wheel holder for vehicle wheel alignment measurement. The invention also relates to a method of mounting and to a method of unmounting such a wheel holder to and from a wheel of a vehicle, in particular a motor vehicle.

For vehicle wheel alignment measurement, there are often mounted wheel holders, which are adapted to support sensors and/or measurement marks ("targets"), on the wheels of the vehicle to be measured for wheel alignment. The handling of such wheel holders, in particular the attaching and detaching thereof to and from the wheels of the vehicle, is as a rule complex and difficult. In particular, there are several working steps required that have to be carried out using two hands. There is a risk that the measurement results of the wheel alignment measurement will be falsified by incorrect and/or inaccurate attachment of the wheel holders.

It is an object of the invention to simplify mounting and unmounting of a wheel holder to and from the wheels of a vehicle and to reduce the risk of incorrect and/or inaccurate mounting.

This object is met by the wheel holder of independent claim 1 and by methods of mounting and removing a wheel holder according to claims 16 and 17. Advantageous developments are indicated in the dependent claims.

The invention relates to a wheel holder that is provided for fastening to a wheel, in particular to a wheel of a motor vehicle, and comprises at least two arms which extend outward from a center of the wheel holder in a radial direction. Each arm comprises a stationary element and at least one movable element, e.g. a carriage. The movable element is movable in the radial direction in relation to the stationary element, so that the length of each arm can be varied by moving the movable element in the radial direction.

The wheel holder comprises furthermore a synchronization system that is designed for synchronizing the movements of the movable elements, and a drive system that is designed to drive the movable elements.

The synchronization system comprises a central rotation element that is disposed in the center of the wheel holder such that it can rotate, and at least two coupling elements each extending between one of the movable elements and the central rotation element such that the movable elements are movable in the radial direction by rotation of the rotation element and, vice versa, the rotation element is rotatable by movement of at least one of the movable elements.

The drive system comprises at least one drive device and at least one force transmitting element. The at least one drive device is connected to one of the movable elements via the at least one force transmitting element and is designed to generate a force, in particular an elastic force. The at least one force transmitting element is designed to transfer the force generated by the at least one drive device to one of the movable elements such that the force acting on the movable element is directed towards the center of the wheel holder.

By way of the forces generated by the drive system, the movable elements are thus pulled towards the center of the wheel holder. When the wheel holder is mounted on a wheel, the movable elements are pressed by the drive system against the tread surface of the wheel from the outside, so that the wheel holder is securely fixed to the wheel.

The length of the arms of a wheel holder according to the invention can be varied simply by moving the movable elements in the radial direction in order to thus easily fix the wheel holder to a wheel and release the same from the wheel, respectively. The synchronization system synchronizes the movements of the movable elements so that all movable elements at all times move synchronously, i.e. all inward or all outward, and across the same movement distance.

Handling of the wheel holder is thus considerably simplified. A wheel holder according to the invention can be aligned on the wheel, in particular centered on a wheel axis, with high accuracy. A wheel holder according to the invention is equally suitable for right and left-handers.

The at least one drive device, together with the at least one force transmitting element, constitutes a drive system that is independent of the synchronization system. In particular, the at least one drive device and the at least one force transmitting element are formed as independent elements that are separate from the rotation element and the coupling elements.

A wheel holder according to the invention permits a particularly space-saving and compact construction. In particular, the dimension (thickness) of the wheel holder in a direction orthogonal to the plane spanned by the arms of the wheel holder can be kept small. Furthermore, a configuration of a wheel holder according to the invention permits efficient synchronization of the movable elements of the wheel holder, pressing the same with high force against the tread surface of the wheel in order to thus safely fix the wheel holder to the wheel.

The invention also comprises a method of mounting a wheel holder according to the invention to a wheel, in particular a wheel of a motor vehicle. The method comprises the steps of moving the movable elements of the wheel holder in synchronous manner outward in the radial direction in order to increase the arm lengths of the arms; applying the wheel holder to a wheel, in particular a wheel of a motor vehicle; and moving the movable elements in synchronous manner toward the center of the wheel holder by means of the force exerted by the at least one drive device, so as to reduce the arm lengths of the arms and thereby fix the wheel holder to the wheel.

The invention also comprises a method of removing a wheel holder according to the invention from a wheel, in particular a wheel of a motor vehicle. The method comprises the steps of moving the movable elements in synchronous manner outward in the radial direction, against the force exerted by the at least one drive device, so as to increase the length of the arms such that the wheel holder can easily be taken off from the wheel.

In one embodiment, the at least one force transmitting element extends substantially parallel to one of the arms, in particular along one of the arms. In this manner, the force generated by the drive device can be transferred to the movable elements of the wheel holder in particularly efficient manner.

In one embodiment, the at least one force transmitting element comprises a chain, a wire, a cable pull, in particular a steel cable pull, or a belt. Such a force transmitting element is flexible so that it can be routed easily between the drive device and the respective movable element. A flexible force transmitting element, for example, can be passed around rollers. A flexible force transmitting element can also be wound onto a rotary element, for example a wheel, a roller or a drum, of the drive device so as to apply a tensile force or traction to the movable element.

In one embodiment, the at least one drive device comprises a wheel, a roller or a drum, and the at least one force transmitting element can be wound onto the wheel, the roller or the drum in order to apply a tensile force to the movable element. In one embodiment, the wheel, roller or drum is rotatable about an axle that is aligned orthogonal to a common plane of the arms. In this manner, the tensile force can be transferred efficiently from the drive device to one of the movable elements.

In one embodiment, the at least one drive device comprises an elastic element that is designed to drive the force transmitting element. The elastic element in particular may be a spiral spring. A spiral spring allows the provision of an inexpensive and reliable drive device.

In one embodiment, the at least one drive device is arranged outside of the center of the wheel holder, in particular spaced apart from a central axis about which the rotation element rotates ("rotation element axis"). In one embodiment, the at least one drive device is arranged in particular in a region/angle between two adjacent arms of the wheel holder. In particular, the at least one drive device may be arranged near the base plate and/or adjacent the base plate between two adjacent arms of the wheel holder.

Such a configuration permits a particularly space-saving and compact construction of the wheel holder. In particular, the dimension (thickness) of the wheel holder in a direction orthogonal to the plane spanned by the arms of the wheel holder can be kept small. Furthermore, such a configuration permits an efficient transfer of the force generated by the at least one drive device to one of the movable elements.

In one embodiment, the at least one drive device is arranged in the center of the wheel holder, in particular on the rotation element axis.

In one embodiment, the wheel holder comprises at least two drive devices and at least two force transmitting elements. By way of two or more drive devices, the elastic force acting in total on the movable elements ("overall force") can be increased. By applying a high overall force, the wheel holder can be fixed to the wheel in particularly secure and tight manner.

In one embodiment, the drive devices are arranged between different arms of the wheel holder and act on different movable elements of the wheel holder. By distributing the forces exerted by the drive devices to several movable elements, it is possible to reduce the forces acting on the coupling elements and the rotation element. The coupling elements and the rotation elements can then be formed less massive, i.e. lighter and of less material, and thus can be formed at lower costs.

In one embodiment, the rotation element is rotatable about a rotation element axis that is aligned orthogonal to a common plane of the arms, and/or the coupling elements extend substantially parallel to a plane spanned by the arms. In this manner, the movements of the movable elements can be synchronized with each other in particularly efficient manner.

In one embodiment, the rotation element is designed as a star-shaped rotation element comprising a central portion and at least two rotation element arms, and each of the coupling elements is connected to one of the rotation element arms. By way of a star-shaped rotation element formed with rotation element arms, it is possible to realize, with little material usage, a mechanical transmission in order to increase the movement distances over which the coupling elements move when the rotation element is rotated by a predetermined angle.

In one embodiment, the coupling elements are each pivotably connected to the rotation element and the movable elements in order to enable an efficient transmission of force from the rotation element to the movable elements.

In one embodiment, the wheel holder has three arms that allow the wheel holder to be securely attached to a wheel. In particular, the three arms can be aligned in a symmetric configuration with equal angular distances of 120°, with other angular distances, however, being possible as well.

In other possible embodiments the wheel holder has more than three arms.

An exemplary embodiment of a wheel holder according to the invention will be described in more detail in the following with reference to the accompanying drawings.

DESCRIPTION OF THE FIGURES

Figure 1:
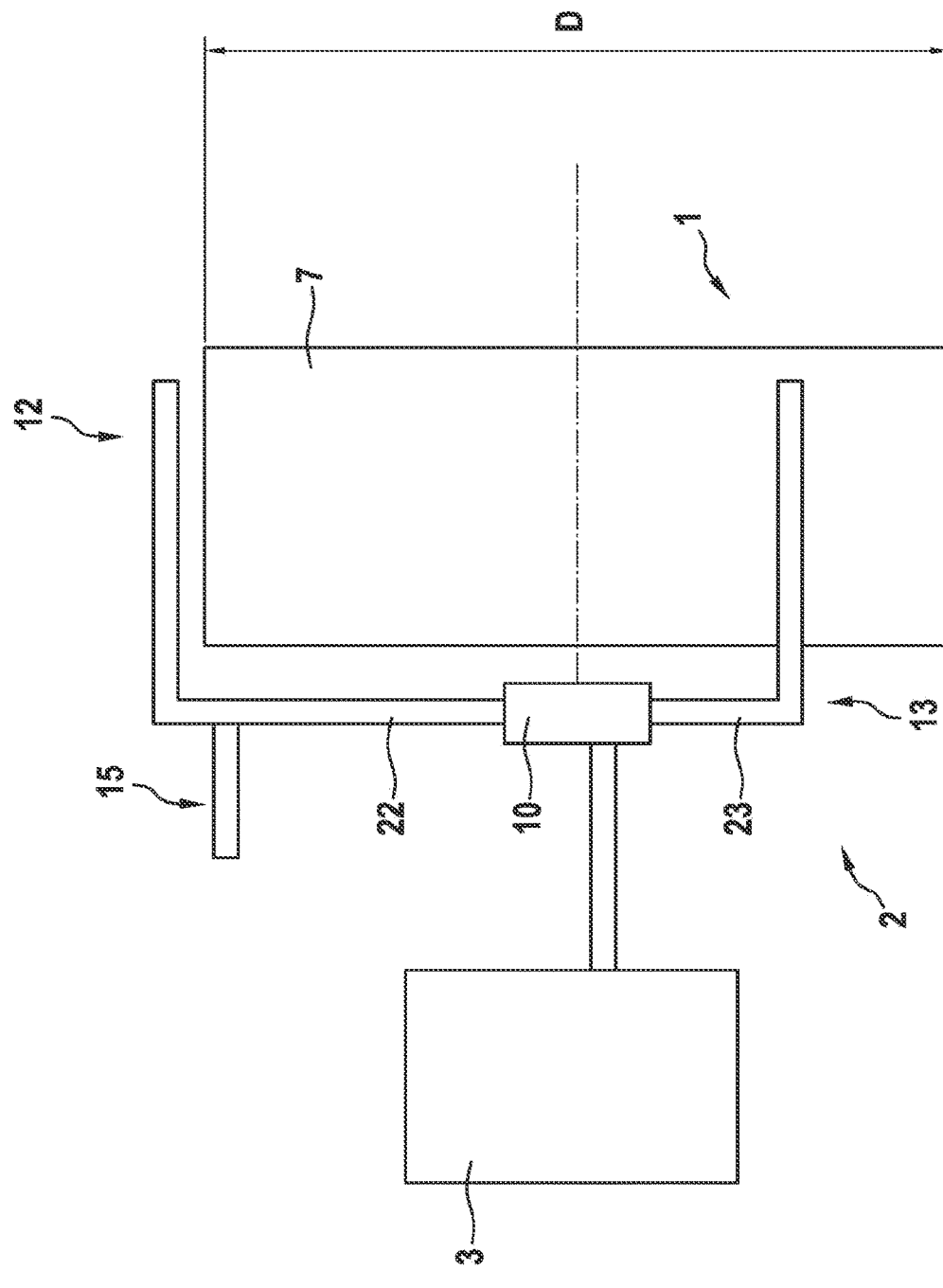
FIG. 1 shows a schematic representation of a wheel with a wheel holder attached to the wheel.

FIG. 1 shows a schematic representation of a wheel 1 together with a wheel holder or wheel clamp 2 which is mounted on the wheel 1 and has a target 3 attached thereto.

Figure 2:
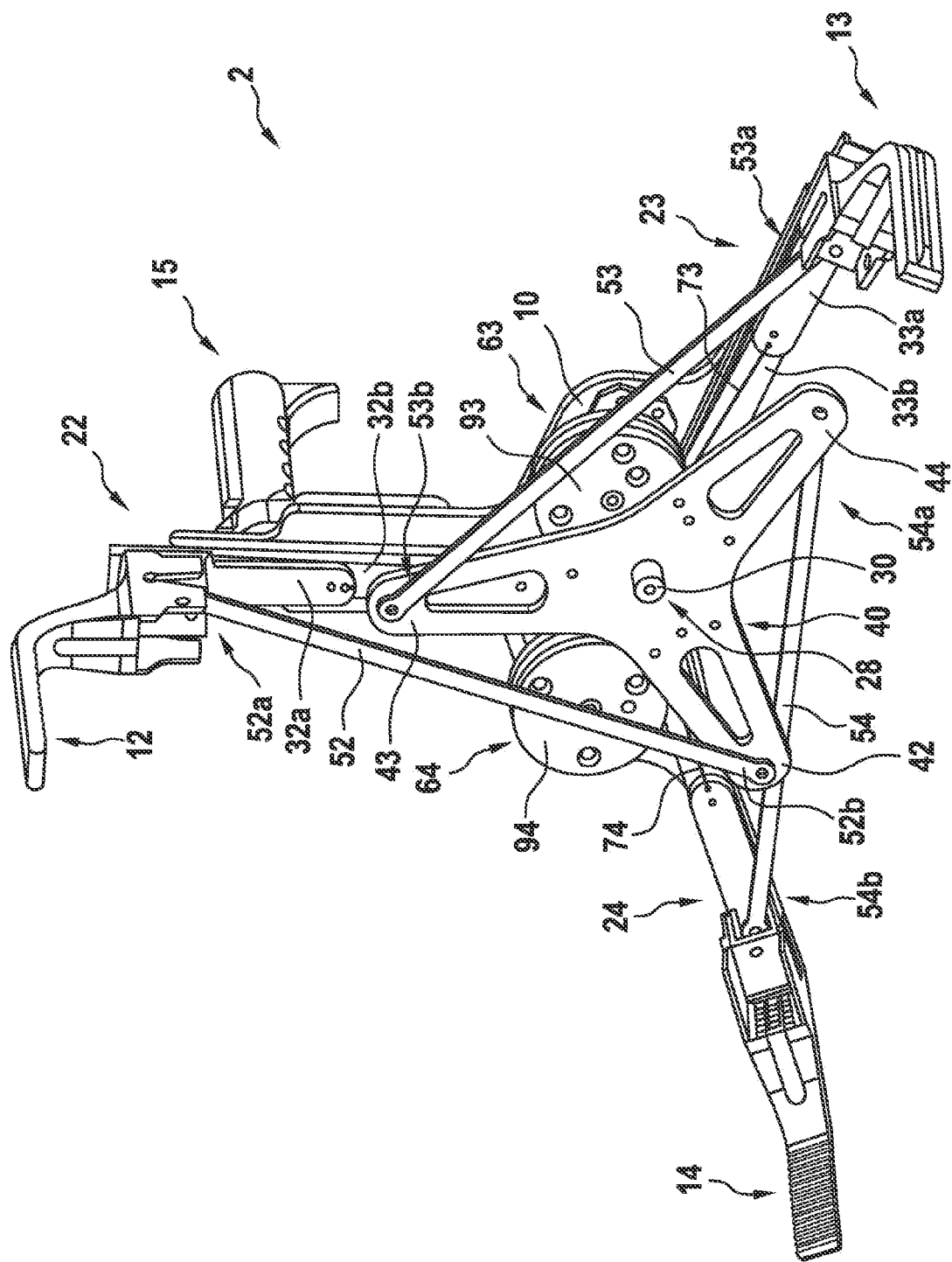
FIGS. 2 and 3 each show a perspective view of a wheel holder according to an embodiment of the invention.
Figure 3:
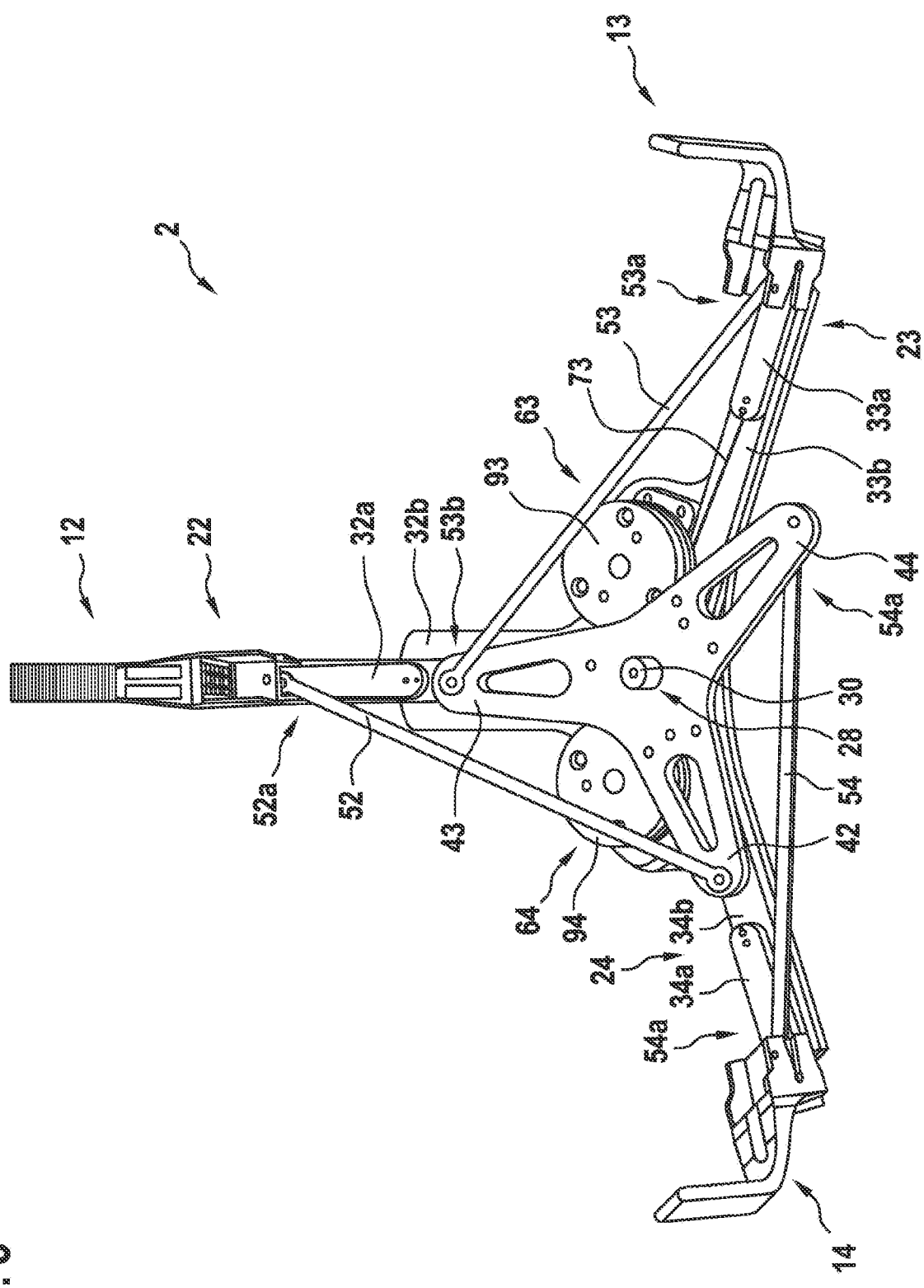
Figure 4:
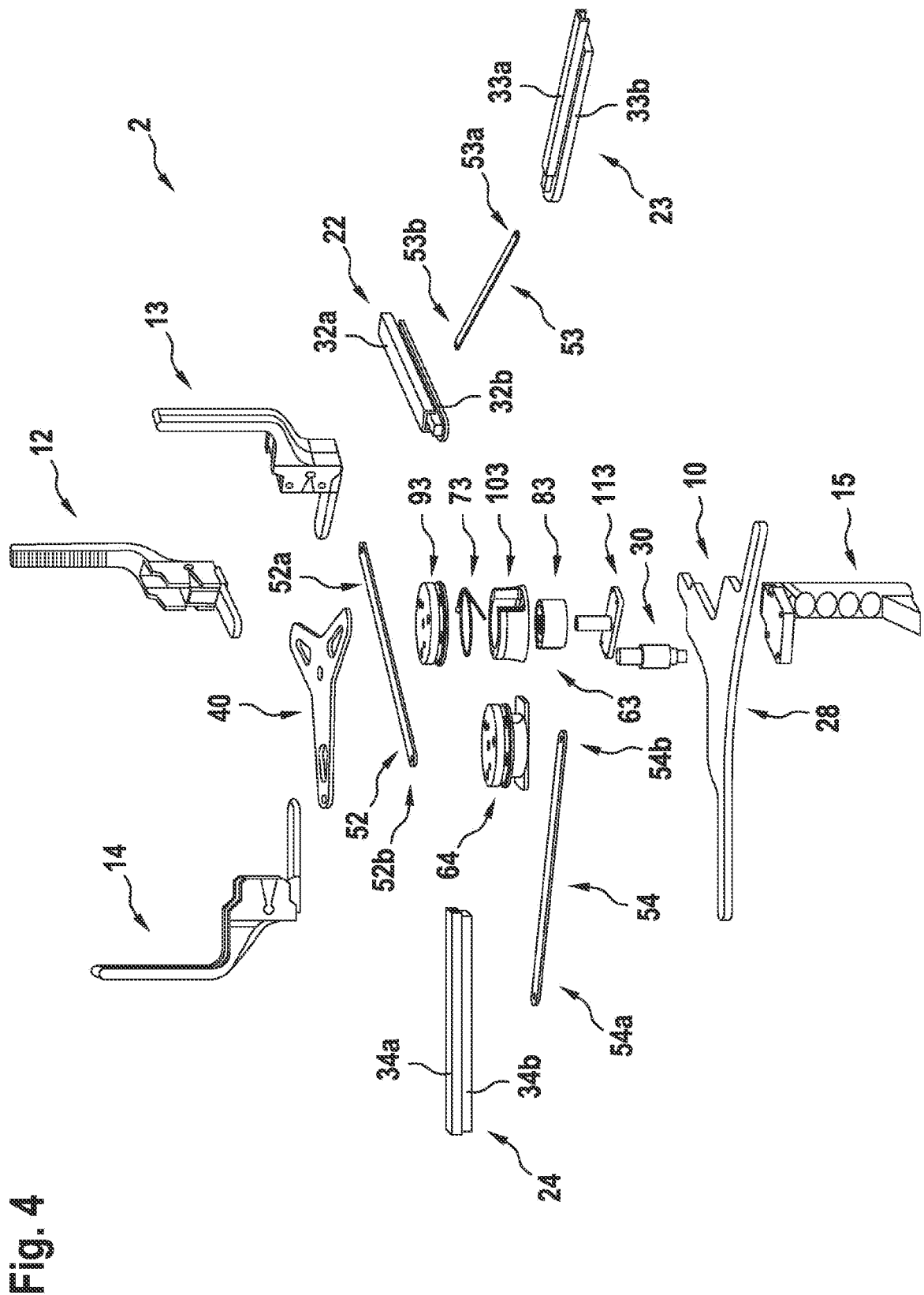
FIG. 4 shows an exploded view of the wheel holder shown in FIGS. 2 and 3.

FIGS. 2 and 3 each show a perspective view of a wheel holder 2 according to an exemplary embodiment of the invention. FIG. 4 shows an exploded view of the wheel holder 2 shown in FIGS. 2 and 3.

The wheel holder 2 comprises a base plate 6 and three arms 22, 23, 24 extending radially outward from a central portion ("center") 28 of the wheel holder 2. The arms 22, 23, 24 extend substantially parallel to the plane of the base plate 6. The arms 22, 23, 24 may be, but do not have to be, aligned at equal angular distances of 120° relative to one another.

One of the arms 22, 23, 24 has a handle 15 formed thereon for facilitating transport and handling of the wheel holder 2.

A central axis ("rotation element axis") 30 extends orthogonal to the base plate 6 through the center 28 of the wheel holder 2.

The arms 22, 23, 24 each comprise a stationary inner element 32b, 33b, 34b and a movable outer element 32a, 33a, 34a which is displaceable in the radial direction along the respective inner element 32b, 33b, 34b. The length of the arms 22, 23, 24 in the radial direction can thus be varied by moving, in particular sliding, the outer elements 32a, 33a, 34a along the inner elements 32b, 33b, 34b.

At outer ends of the outer elements 32a, 33a, 34a facing away from the center 28, claws 12, 13, 14 are formed which extend substantially at right angles to the arms 22, 23, 24. The claws 12, 13, 14 are designed to rest on the tread surface 7 of a wheel 1, not shown in FIGS. 2 and 3, when the wheel holder 2 is attached to the wheel 1 (see FIG. 1), in order to fix the wheel holder 2 to the wheel 1.

By moving/sliding the outer elements 32a, 33a, 34a outward in the radial direction, the length of the arms 22, 23, 24 is extended so that the wheel holder 2 can be easily attached to the wheel 1 in the axial direction of the wheel 1. By moving the outer elements 32a, 33a, 34a inward, i.e. in the direction towards the center 28, the length of the arms 22, 23, 24 is decreased, so that the claws 12, 13, 14 rest on the tread surface 7 of the wheel 1 and fix the wheel holder 2 to the wheel 1, as shown in FIG. 1.

A wheel holder 2 according to an exemplary embodiment of the invention comprises furthermore a central rotation element 40, for example a rotation plate 40. The rotation element 40 is mounted on the central axis 30 in the center 28 of the base plate 6 such that it can be rotated about the central axis 30. The rotation element 40 extends substantially parallel to the plane spanned by the base plate 6 and the arms 22, 23, 24.

Each of the movable elements 32a, 33a, 34a is connected to the rotation element 40 by a respective coupling element 52, 53, 54.

An inner end 52b, 53b, 54b of each coupling element 52, 53, 54, which is directed towards the center 28, is movably, in particular pivotably, connected to the rotation element 40. An outer end 52a, 53a, 54a of each coupling element 52, 53, 54, which is directed away from the center 28, is movably, in particular pivotably, connected to one of the movable elements 32a, 33a, 34a. The coupling elements 52, 53, 54 are thus pivotable with respect to the rotation element 40 and the movable elements 32a, 33a, 34a in a plane extending substantially parallel to the plane of the base plate 6.

The coupling elements 52, 53, 54 transform any rotational movement of the rotation element 40 about the central axis 30 into translational movements of the movable elements 32a, 33a, 34a in the radial direction, in particular along the stationary inner elements 32b, 33b, 34b, and vice versa. Thus, by rotating the rotation element 40 about the central axis 30, the movable elements 32a, 33a, 34a can be moved synchronously, i.e. in the same direction ("inward" or "outward") and at the same speed, in the radial direction along the inner elements 32b, 33b, 34b in order to thus vary the length of the arms 22, 23, 24. Likewise, the rotation element 40 rotates about the central axis 30 when the movable elements 32a, 33a, 34a are moved in the radial direction along the inner elements 32b, 33b, 34b.

By way of the rotation element 40 and the coupling elements 52, 53, 54, the movable elements 32a, 33a, 34a of the arms 22, 23, 24 are coupled to one another such that all movable elements 32a, 33a, 34a move synchronously with one another when one of the movable elements 32a, 33a, 34a is moved. The rotation element 40 and the coupling elements 52, 53, 54 thus constitute a synchronization system.

The distance between the claws 11, 12, 13 can thus be easily adjusted by moving one of the movable elements 32a, 33a, 34a, such that the wheel holder 2 can be easily, in particular with just one hand, applied to the wheel 1.

In the exemplary embodiment shown in FIGS. 2 to 4, the coupling elements 52, 53, 54 are designed as coupling rods 52, 53, 54. The coupling elements/coupling rods 52, 53, 54 may be formed of e.g. stamped sheet metal parts.

The coupling elements 52, 53, 54 may also have a different shape, as long as they fulfill the previously described function of coupling the rotation element 40 with the movable elements 32a, 33a, 34a such that rotational movement of the rotation element 40 causes translational movements of the movable elements 32a, 33a, 34a, and vice versa.

In the exemplary embodiment shown in FIGS. 2 to 4, the rotation element 40 is in the form of a star-shaped rotation element 40 with three rotation element arms ("rotation element projections") which extend radially outward from a central portion of the rotation element 40, which is mounted on the central axis 30. The coupling elements 52, 53, 54 are each pivotably connected to an outer portion of one of the rotation element arms 42, 43, 44.

By way of a star-shaped design of the rotation element 40, it is possible with little expenditure and little material usage to implement a mechanical transmission which increases the distance over which the movable elements 32a, 33a, 34a move in the radial direction when the rotation element 40 is rotated about the central axis 30 by a predetermined angle.

However, the rotation element arms 42, 43, 44 of the rotation element 40 shown in the figures are not a necessary feature of the invention. The rotation element 40 may also be in the form of e.g. a round, in particular a circular or elliptical, disk or an angular, e.g. triangular, square or polygonal disk.

A wheel holder 2 formed in accordance with an exemplary embodiment of the invention comprises, furthermore, at least one drive device 63, 64 designed for driving or drivingly moving at least one of the movable elements 32, 33, 34.

The wheel holder 2 shown in FIGS. 2 to 4 comprises two drive devices 63, 64. However, a wheel holder 2 according to an exemplary embodiment of the invention may also have only one drive device 63, 64 or more than two drive devices 63, 64, in particular a separate drive device 63, 64 for each one of the arms 22, 23, 24.

The drive devices 63, 64 are each arranged between two adjacent arms 22, 23, 24 of the wheel holder 2. In particular, the drive devices 63, 64 are arranged in the angle that is formed by two adjacent arms 22, 23, 24 at the base plate 10.

In an alternative embodiment, not shown in the figures, one of the drive devices 63, 64 is arranged in the center 28 of the wheel holder 2, in particular on the central axis ("rotation element axis") 30.

Each of the drive devices 63, 64 is connected to a respective inner end of an associated force transmitting element 73, 74. The outer ends of the force transmitting elements 73, 74 are each connected to one of the movable elements 32a, 33a.

Together with the force transmitting elements 73, 74, the drive devices 63, 64 form a drive system which drives or drivingly moves the movable elements 32a, 33a. In particular, the drive devices 63, 64 are designed to apply an elastic force to the respectively associated force transmitting element 73, 74 which elastically pulls the respective force transmitting element 73, 74, and thus also the movable element 32a, 33a connected to the respective force transmitting element 73, 74, in the direction towards the center 28 of the wheel holder 2.

Also when the wheel holder 2, as in the embodiment shown in FIGS. 2 to 4, has a lesser number of drive devices 63, 64 and force transmitting elements 73, 74 than arms 22, 23, 33, coupling of the movable elements 32a, 33a, 34a by the synchronization system 40, 52, 53, 53 has the effect that the movable elements 32a, 33a, 34a and the claws 11, 12, 13 of the wheel holder 2 move synchronously in the radial direction along the stationary elements 32b, 33b, 34b of the arms 22, 23, 24, when at least one of the movable elements 32a, 33a, 34a and/or one of the claws 11, 12, 13 is moved.

In particular, the movable elements 32a, 33a, 34a can be moved/pulled outward against the elastic forces generated by the drive devices 63, 64, which act in the direction towards the center 28 of the wheel holder 2, by muscle power in order to extend the arms 22, 23, 24 such that the wheel holder 2 can be conveniently attached to a wheel 1 or removed from the same.

Due to the elastic forces generated by the drive devices 63, 64, which are directed towards the center 28 of the wheel holder 2, the wheel holder 2 automatically adapts to different sizes (diameters D) of the wheel 1 in the radial direction within the scope of movement, i.e. the maximum path length, of the outer elements 32a, 33a, 34a. A wheel holder 2 according to the invention thus can be very easily attached to wheels 1 of different sizes and removed from such wheels 1.

Figure 5:
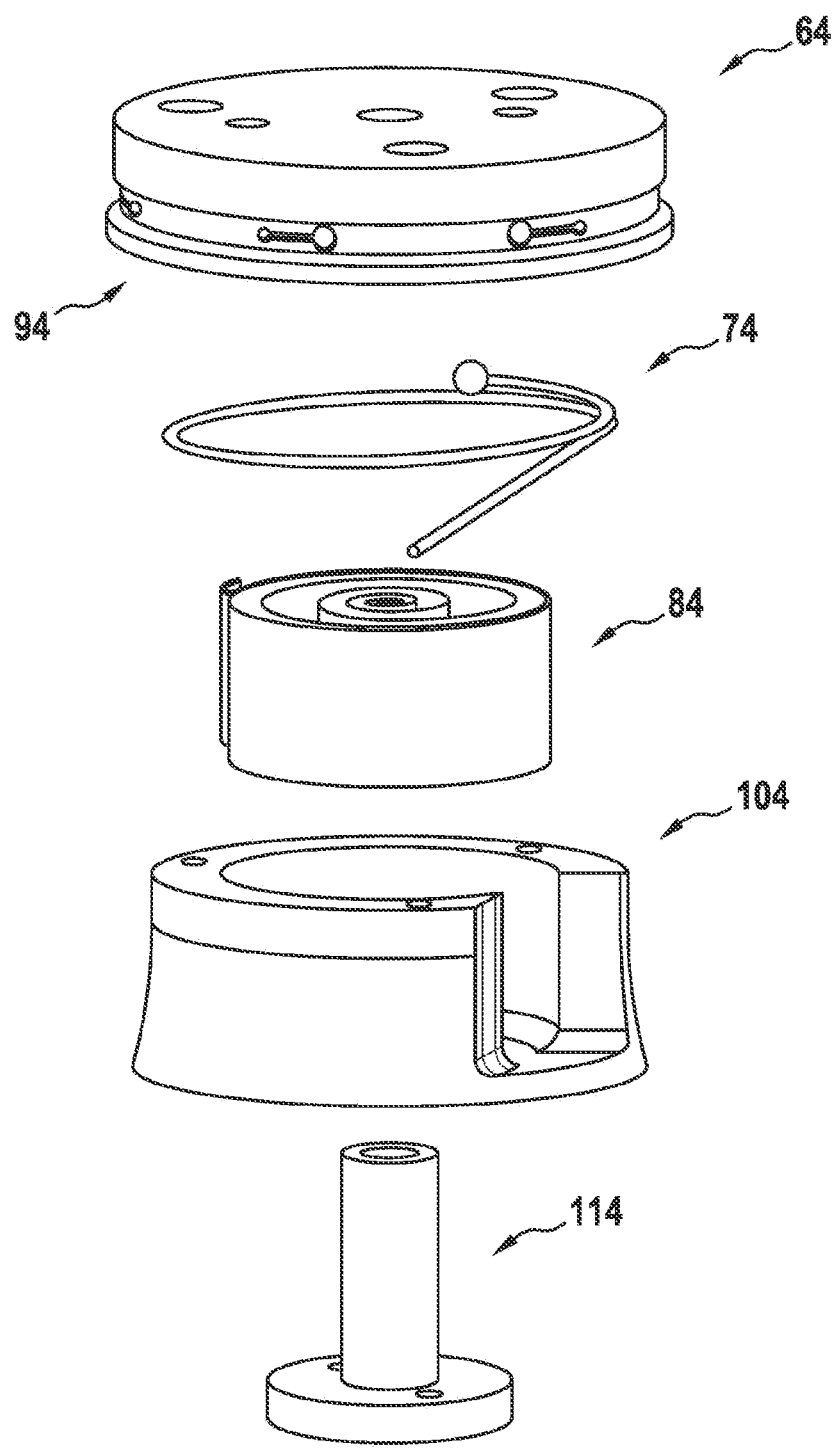
FIG. 5 shows an exploded view of a drive device as it is used with the wheel holder shown in FIGS. 2 to 4.

FIG. 5 shows an enlarged exploded view of a drive device 63, 64 as it is used in a wheel holder 2 formed in accordance with an exemplary embodiment of the invention.

The drive device 64 shown in FIG. 5 has a substantially rotationally symmetrical housing 104 extending about a central axle 114. Mounted on the axle 114 is a drum 94. The drum 94 is rotatable about the axle 114 and designed to wind up a flexible force transmitting element 74, e.g. a flexible rope, such as a steel rope as it is used in a Bowden cable, on the drum 94.

The axle 114 is aligned substantially orthogonal to the plane spanned by the arms 22, 23, 24 of the wheel holder 2.

The flexible force transmitting element 74 may also be in the form of a chain, belt, wire or the like, as long as it can be wound onto a drum 94 or a wheel or similar rotating element not shown in the figures, and is capable of transferring a sufficiently large force from the drive device 64 to the movable element 34a.

Between the drum 94 and the axle 140, there is disposed an elastic element 84, for example a spiral spring. The elastic element 84 is connected to the drum 94 and the axle 114 such that it drivingly moves the drum 94 so that the drum 94 endeavors to rotate about the axle 114 and, in doing so, to wind up and thus shorten the flexible force transmitting element 74.

By winding-up the flexible force transmitting element 74 on the drum 94, the force transmitting element 74 exerts an elastic (tensile) force on the movable element 34a connected to the second end of the force transmitting element 74 (not shown in FIG. 4), with the elastic force trying to pull the movable element 34a in the direction towards the center 28 of the wheel holder 2.

When the claws 12, 13, 14 of the wheel holder 2 are pulled apart, the force transmitting element 74 is unwound from the drum 94.

The rotation of the drum 94 about the axle 140 which is caused by unwinding the force transmitting element 74 from the drum 94, effects additional tension in the elastic element 84 connected to the drum 94. The movable element 34a of the wheel holder 2 is thus pulled again in the direction towards the center 28 of the wheel holder 2 by the force transmitting element 74, as soon as the force applied by a user for pulling apart the movable elements 32a, 33a, 34a or claws 12, 13, 14 is removed, e.g. because the claws 12, 13, 14 are released.

A wheel holder 2 formed in accordance with an exemplary embodiment of the invention can thus be easily mounted on a wheel 1 and unmounted from the wheel 1.

The invention claimed is:

1. A wheel holder (2) for fastening to a wheel (1), including a wheel (1) of a motor vehicle, the wheel holder (2) comprising:
   at least two arms (22, 23, 24) extending outward from a center (28) of the wheel holder (2) in a radial direction, each of the at least two arms (22, 23, 24) having at least one movable element (32, 33, 34) that is movable in the radial direction;
   a synchronization system (40, 52, 53, 54) which is designed to synchronize the at least one movable elements (32, 33, 34), the synchronization system (40, 52, 53, 54) comprising:
      a central rotation element (40) that is disposed in the center (28) of the wheel holder (2) such that it can rotate; and
      at least two coupling elements (52, 53, 54) each extending between one of the at least one movable elements (32, 33, 34) and the central rotation element (40) such that the at least one movable elements (32, 33, 34) are movable in the radial direction by rotation of the central rotation element (40); and
   a drive system (63, 64, 73, 74) which is designed to drive the at least one movable elements (32, 33, 34), the drive system (63, 64, 73, 74) comprising at least one drive device (63, 64) and at least one force transmitting element (73, 74);
   wherein the at least one drive device (63, 64) is designed to generate a force and to transfer the same via the at least one force transmitting element (73, 74) to one of the at least one movable elements (32, 33, 34) such that the force acting on the at least one movable element (32, 33, 34) is directed towards the center (28) of the wheel holder (2); and
   wherein the at least one drive device (63, 64) comprises a wheel, a roller or a drum (93, 94), and wherein the at least one force transmitting element (73, 74) is adapted to be wound onto the wheel, the roller or the drum (93, 94).

2. The wheel holder (2) according to claim 1, wherein the at least one force transmitting element (73, 74) extends substantially parallel to one of the at least two arms (22, 23, 24), including along one of the at least two arms (22, 23, 24).

3. The wheel holder (2) according to claim 2, wherein the at least one force transmitting element (73, 74) comprises a chain, a wire, a cable pull or a belt.

4. The wheel holder (2) according to claim 2, wherein the wheel, the roller or the drum (93, 94) is adapted to be rotated about an axle (113, 114) that is aligned orthogonal to a common plane of the at least two arms (22, 23, 24).

5. The wheel holder (2) according to claim 2, wherein the drive system (63, 64, 73, 74) is a drive system (63, 64, 73, 74) that is independent of the synchronization system (40, 52, 53, 54).

6. The wheel holder (2) according to claim 1, wherein the at least one force transmitting element (73, 74) comprises a chain, a wire, a cable pull or a belt.

7. The wheel holder (2) according to claim 1, wherein the wheel (1), the roller or the drum (93, 94) is adapted to be rotated about an axle (113, 114) that is aligned orthogonal to a common plane of the at least two arms (22, 23, 24).

8. The wheel holder (2) according to claim 7, wherein the wheel (1), the roller or the drum (93, 94) is adapted to be rotated about an axle (113, 114) that is aligned orthogonal to a common plane of the at least two arms (22, 23, 24).

9. The wheel holder (2) according to claim 1, wherein the drive system (63, 64, 73, 74) is independent of the synchronization system (40, 52, 53, 54).

10. The wheel holder (2) according to claim 1, wherein the at least one drive device (63, 64) and the at least one force transmitting element (73, 74) are formed as independent elements separate from the rotation element (4) and the at least two coupling elements (52, 53, 54).

11. The wheel holder (2) according to claim 1, wherein the at least one drive device (63, 64) comprises an elastic element (83), including a spiral spring, which is adapted to drive the at least one force transmitting element (73, 74).

12. The wheel holder (2) according to claim 1, wherein the at least one drive device (63, 64) is disposed outside of the center (28) of the wheel holder (2), wherein the at least one drive device (63, 63) is disposed in a region between the at least two arms (22, 23, 24) of the wheel holder (2).

13. The wheel holder (2) according to claim 1, wherein the wheel holder (2) comprises at least two drive devices (63, 64) and at least two force transmitting elements (73, 74), wherein the at least two drive devices (63, 64) are arranged between different arms (22, 23, 24) of the wheel holder (2).

14. The wheel holder (2) according to claim 1, wherein the central rotation element (40) is adapted to be rotated about an axle (30) that is aligned orthogonal to a common plane of the at least two arms (22, 23, 24); and wherein the at least two coupling elements (52, 53, 54) extend substantially parallel to the common plane of the at least two arms (22, 23, 24).

15. The wheel holder (2) according to claim 1, wherein the central rotation element (40) comprises a central portion and at least two rotation element arms (42, 43, 44), and wherein each of the at least two coupling elements (52, 53, 54) is connected to one of the at least two rotation element arms (42, 43, 44).

16. The wheel holder (2) according to claim 1, wherein the at least two coupling elements (52, 53, 54) are each pivotably connected to the central rotation element (40) and the at least one movable elements (32, 33, 34).

17. The wheel holder (2) according to claim 1, wherein the wheel holder (2) comprises three arms (22, 23, 24); and wherein the three arms (22, 23, 24) are arranged at angular distances of 120° about the center (28) of the wheel holder (2).

18. A method of mounting a wheel holder (2) according to claim 1, to a wheel (1), including to a wheel (1) of a motor vehicle, said method comprising the steps of:
    moving the at least one movable elements (32, 33, 34) in synchronous manner outward in a radial direction so as to increase the arm lengths of the arms;
    applying the wheel holder (2) to a wheel (1), including a wheel (1) of a motor vehicle; and
    moving the at least one movable elements (32, 34, 34), with the aid of the force exerted by the at least one drive device (63, 64), in synchronous manner in the direction towards the center (28) of the wheel holder (2) in order to fix the wheel holder (2) to the wheel (2).

19. A method of removing the wheel holder (2) according to claim 1 from the wheel (1), said method comprising:
    moving the at least one movable elements (32, 33, 34) in synchronous manner outward in the radial direction against the force exerted by the at least one drive device (63, 64).

* * * * *